United States Patent [19]

Hallstrom et al.

[11] 4,018,944
[45] Apr. 19, 1977

[54] METHOD OF APPLYING A WEARING SURFACE

[75] Inventors: James R. Hallstrom, Brookfield; Raymond J. Hoffman, Fox Point; Ronald L. Walling, Sussex, all of Wis.

[73] Assignee: Rexnord Inc., Milwaukee, Wis.

[22] Filed: Apr. 21, 1975

[21] Appl. No.: 570,194

Related U.S. Application Data

[63] Continuation of Ser. No. 414,874, Nov. 12, 1973, abandoned.

[52] U.S. Cl. .............................. 427/140; 51/298 A; 51/307; 51/308; 51/309 A; 52/177; 52/181; 260/37 EP; 427/287; 427/386
[51] Int. Cl.² ...................... B32B 35/00; B05D 5/00
[58] Field of Search ............ 51/298, 307, 308, 309, 51/407; 52/177, 178, 179, 180, 181; 260/37 EP; 427/140, 386, 204, 277, 278, 286, 287, 366; 428/329, 413

[56] References Cited

UNITED STATES PATENTS

| | | | |
|---|---|---|---|
| 2,943,953 | 7/1960 | Daniel | 427/287 X |
| 3,041,156 | 6/1962 | Rowser et al. | 51/298 |
| 3,087,803 | 4/1963 | Bakian | 51/298 |
| 3,183,633 | 5/1965 | Decker | 51/206 |
| 3,205,054 | 9/1965 | Tucker | 51/298 |
| 3,225,495 | 12/1965 | de Vries | 51/319 |
| 3,360,391 | 12/1967 | Richtzenhein et al. | 427/204 X |
| 3,383,191 | 5/1968 | Thomas | 51/298 |
| 3,469,959 | 9/1969 | Stein | 51/298 |
| 3,502,453 | 3/1970 | Baratto | 51/295 |
| 3,524,286 | 8/1970 | Wohrer | 51/298 |

FOREIGN PATENTS OR APPLICATIONS

| | | | |
|---|---|---|---|
| 1,205,393 | 2/1960 | France | 51/298 |
| 1,506,240 | 12/1967 | France | 51/298 |
| 7,213,294 | 4/1973 | Netherlands | 51/298 |

*Primary Examiner*—Michael R. Lusignan
*Attorney, Agent, or Firm*—Kinzer, Plyer, Dorn & McEachran

[57] ABSTRACT

A method of on-the-job installation of a coating having high resistance to wear caused by impact, abrasion, erosion and corrosion and a composition for use in performing the method. The method includes the preparation of a trowelable composition containing high alumina ceramic particles and a co-abrasive filler of smaller particles of inorganic and/or metallic origin in a polymer matrix and the application of this material to the surface to be repaired or protected.

7 Claims, 2 Drawing Figures

METHOD OF APPLYING A WEARING SURFACE

This is a continuation of application Ser. No. 414,874, filed Nov. 12, 1973, now abandoned.

SUMMARY OF THE INVENTION

This invention is concerned with a method of on-the-job installation of an abrasive resistant coating and a composition for use in performing the method.

An object of this invention is a method of installing an abrasive resistant coating on practically any surface subject to wear regardless of its location.

Another object is a method of applying such a coating using conventional tools and procedures.

Another object is a method of installing an abrasive resistant coating which will conform to the surface to which it is applied.

Another object is a wearing composition which may be installed on the job and yet provides a hard wearing surface for areas of severe wear.

Another object is a trowelable composition which quickly hardens to provide a surface having high resistance to abrasion.

Another object is a method of repairing a worn surface which permits the surface to be put back in operation in a short time.

Another object is a wear resistant composition which can be applied to irregular surfaces such as those found in cones, elbows, etc.

Another object is an abrasive resistant coating having a secondary abrasive filler of a hardness on the order of that of the material causing the wear.

Another object is an abrasive resistant coating which has a fairly long working life in its mixed stage permitting adequate time to trowel it into difficult to reach or large areas, yet which will cure in a relatively short time.

Another object is an abrasive resistant coating that is more resistant to wear than Ni-Hard iron.

Another object is an abrasive resistant coating having a resistance to wear approaching that of ceramic tile.

Another object is an abrasive resistant material that also functions as a corrosion inhibiting coating.

Another object is an abrasive resistant coating which contains alumina ceramic particles.

Another object is an abrasive resistant coating containing alumina ceramic particles which is mixed on the job and in which the particles will not settle out while the composition hardens.

Another object is an abrasive resistant material of the above type that will not settle out in the can.

Other objects may be found in the following specification, claims, and drawings.

FIG. 1 is a side view, in section, through a typical application in a diagrammatic or schematic representation; and FIG. 2 is a portion of FIG. 1 on an enlarged scale.

DESCRIPTION OF THE PREFERRED EMBODIMENT

This invention is directed to a method of installing an abrasive resistant surfacing on machinery and wearing surfaces on the job. This is accomplished by use of a composition having high alumina ceramic particles and a co-abrasive filler of smaller particles which are about as hard as the material causing the wear. The particles and filler are contained in components which may be mixed together on the job to provide a substance that can be applied by troweling or similar methods to the surface to be protected or repaired.

The abrasive resistant coating when mixed has a paste-like consistency which enables it to be applied and to conform to any shape such as cones, elbows and other curved surfaces. The paste-like mixture cures rapidly, permitting the surface to be put back into operation quickly. The coating could have a working life of on the order of 30–45 minutes at 68° F., which allows ample time to trowel the material onto difficult to reach or large surfaces. It will cure for use in 3–16 hours at 70° F. When necessary, curing time can be reduced by heating metal surfaces to hand warmth or warmer before or after applying the composition. This will reduce the curing or hardening time to, say, approximately 1 hour.

Figure 1:
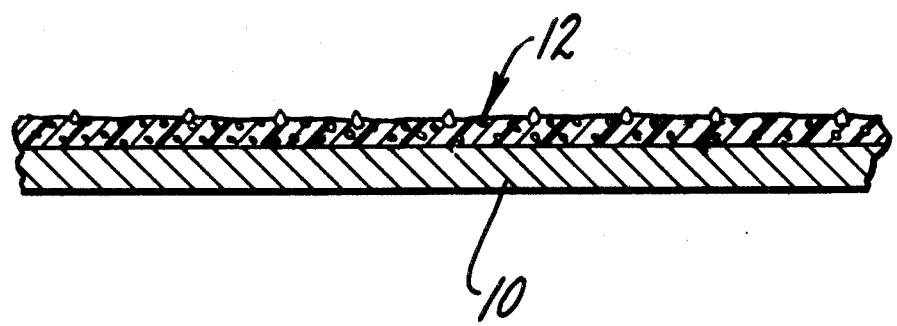
Figure 2:
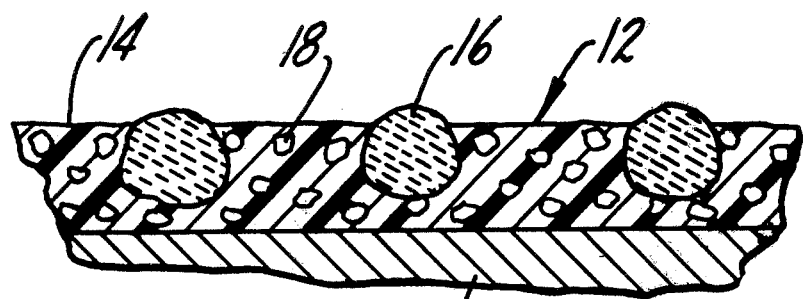

A composition usable in the method of this invention may take many different forms. In the drawing, a base or substrate 10 has been shown which may be assumed to be a worn-out part, such as a liner, chute or what-have-you. A coating or composition 12 is superimposed on the surface thereof and, as shown in FIG. 2, in a somewhat schematic or diagrammatic manner, the coating includes a matrix or base substance or bonding agent 14 containing and holding in place large abrasive resistant particles 16 at suitable intervals with smaller abrasive filler particles 18 in the matrix and interposed between and around the larger beads or chips. The matrix material, which may be a polymer, bonds to the surface of the part 10 to be protected and holds the larger abrasive resistant particles 16 in position in relation thereto and in relation to each other and also holds the co-abrasive filler particles 18 in a random dispersion throughout the matrix and in position to take the wear. The matrix itself which may include the resin and a thixotropic agent, when mixed and adhering to the surface, acts as a cushion for the large abrasive resistant particles. During impact of the material causing wear, such as the various types of ores, sand, gravel, etc., energy is transmitted to the matrix from the particles and is dissipated. This prevents cracking and breaking of the more brittle large abrasive resistant particles.

In such a composition, the co-abrasive or secondary filler particles 18 are of a much smaller size than the primary abrasive resistant particles 16 and these smaller particles fill the voids or interstices between the large abrasive particles. The co-abrasive filler 18 protects the polymer matrix 14 from being worn away from the abrasive resistant particles. As a result, the abrasive resistant particles remain in place in the matrix longer providing a longer wearing surface. The abrasive resistant particles and co-abrasive filler are maintained in suspension in the polymer matrix during mixing and curing operations by means of a thixotropic agent.

While many polymers, abrasive resistant particles, co-abrasive fillers and thixotropic agents may be found suitable for a composition to be used in the method of this invention, a more specific and particularly desirable composition is obtained by the use of high alumina ceramic beads as the abrasive resistant particles. More specifically, the use of metal coated alumina ceramic particles of the type sold by Coors Porcelain Company of Golden, Colo. under the trademark METLX has been found to produce an outstanding abrasive resistant coating. This ceramic is a high alumina (90% type)

which has very fine grain (crystal) boundaries to give good abrasive resistance. A coating of metal is placed on the surfaces of ceramic particles. It has been found that polymers and other matrices bond better to the metal coating than they do directly to ceramic. The particles used may be on the order of a fraction of an inch, for example approximately 1/16th of an inch, in their largest dimension.

A co-abrasive filler found to function particularly well in a wearing composition applied in accordance with the method of this invention may be silicon carbide, 180 mesh size. However, other fillers may be used as long as they are about as hard as the material being handled, in other words, the material causing the wear on the surface being protected. By way of example, but not of limitation, the following substances may be used as fillers:

Diamond dust, boron carbide, boron nitride, tungsten carbide alumina ceramic, silica sand, taconite, etc.

The cost of the wearing composition used in connection with the method of this invention may be reduced by matching the co-abrasive filler to the material causing wear. For example, where sand is the abrasive material causing the wear, silica sand or silica flour may be used as the co-abrasive filler.

The composition of the matrix holding the large abrasive resistant particles in position may vary over a wide range. For example, many types of polymers may be used, such as: epoxide polymers; unsaturated polyester (carboxylate-glycol adduct); a polyurethane; a polyimide or polyamide resin or the like. A particular polymer found to function particularly well as the matrix is an epoxy resin containing a thixotropic agent which resin is cured by means of a mixed polyamine/polyamide curing agent. The thixotropic agent used is a pure CALIDRIA asbestos sold under the designation RG-144 by Union Carbide Corporation. Other agents might be Bentonite, fumed silica, M-P-A by Baker Caster Oil, polyacrylamide and so forth.

In the composition intended for use with the method of this invention, it has been found desirable to provide the large abrasive resistant particles and the co-abrasive filler in both the resin and curing components of the epoxy resin composition. The purpose of doing this is two-fold. First, it provides a mixing ratio between the resin and curing components of approximately 2 to 1 whether the components are measured by weight or volume. Second, it provides thorough wetting of all the abrasive particles and co-abrasive filler. A thorough wetting of these materials is difficult to obtain if the materials are provided in only one of the two components.

A specific example of a suitable composition for use in practicing the method of this invention is:

| Resin Component | Parts by Weight |
|---|---|
| "EPON" Resin 828, Shell Chemical Corporation | 50.0 |
| Asbestos, "RG-144", Union Carbide Corporation | 3.0 |
| TiO$_2$, "TITANOX" National Lead Co. | 1.0 |
| Silicon Carbide, 180 X, Simonds Abrasive Div., The Wallace Murray Corp. | 23.3 |
| Coors "METLX" Pellets | 130.0 |
| | 207.3 |
| Curing Component | Parts by Weight |
| Jefferson AL-1, Jefferson Chemical Company | 10.0 |
| Vanamid 50-40, R. T. Vanderbilt Company | 10.0 |
| Asbestos, "RG-144", Union Carbide Corporation | 2.0 |
| Silicon Carbide, 180 X, Simonds Abrasive Div., The Wallace Murray Corp. | 21.7 |
| Coors "METLX" Pellets | 70.0 |
| | 113.7 |

In this example the resin may be supplied in one can and the curing agent in another, the two being sold together with the resin can being, for example, a one-gallon container and the curing components being in a one-half-gallon can. This is merely an example and it should be understood that any suitable sizes could be used depending upon the needs of the customer and the amount of material to be used in an application. But a one-gallon can for the resin and the one-half-gallon can for the curing agent has been found convenient. In such a situation a proportion of the amounts would be emptied from each and thoroughly mixed before application to the surface to be protected. And, if all of the resin and curing agents in the two-can kit are not used at once, the cans may be sealed up and used later.

The above example, when mixed, applied, and cured, has the following characteristics:

| | |
|---|---|
| Tensile Strength | 4,000 psi |
| Compressive Strength | 15,000 psi |
| Heat Deflection Temperature | 195 ° F. |
| Lap Shear Strength | 2,000 psi |
| Gel Time | 90 min. |
| Working Time | 30 min. at 70° F. |

Another example of a suitable composition is as follows:

| Resin Component | Parts by Weight |
|---|---|
| Dow DER 330, Dow Chemical Co. | 50.0 |
| Asbestos, "RG-144", Union Carbide Corporation | 3.0 |
| TiO$_2$, "TITANOX", National Lead Co. | 1.5 |
| Silicon Carbide, 180 X, Simonds Abrasive Div., The Wallace Murray Corp. | 23.3 |
| Coors "METLX" Pellets | 130.0 |
| | 207.8 |
| Curing Component | Parts by Weight |
| Jefferson AL-1, Jefferson Chemical Company | 10.0 |
| Versamid 140, General Mills | 10.0 |
| Asbestos, "RG-144", Union Carbide Corporation | 1.0 |
| Silicon Carbide, 180 X, Simonds Abrasive Div., The Wallace Murray Corp. | 21.7 |
| Coors "METLX" Pellets | 70.0 |
| | 112.7 |

The above composition is believed to have the advantage of better viscosity control.

Another example of a suitable composition is as follows:

| Resin Components | Parts by Weight |
|---|---|
| "EPON" 3280, Shell Chemical Corporation | 50.0 |
| Asbestos, "RG-144", Union Carbide Corporation | 2.5 |
| TiO$_2$, "TITANOX", National | |

-continued

| | |
|---|---|
| Lead Co. | 1.5 |
| Silicon Carbide, 180 X, Simonds Abrasive Div., The Wallace Murray Corp. | 23.3 |
| Coors "METLX" Pellets | 130.0 |
| | 207.3 |
| Curing Components | Parts by Weight |
| TETA (D.E.H. 24), Dow Chemical | 10.0 |
| Polyamine PA-400, Jefferson Chemical Company | 10.0 |
| Asbestos, "RG-144", Union Carbide Corporation | 2.0 |
| Silicon Carbide, 180 X, Simonds Abrasive Div., The Wallace Murray Corp. | 21.7 |
| Coors "METLX" Pellets | 70.0 |
| | 113.7 |

This example is believed to have the advantage of longer term shelf stability and would be suitable for uses or applications that require such.

Another example is as follows:

| Resin Components | Parts by Weight |
|---|---|
| Dow DER 330, Dow Chemical | 100.0 |
| Silicon Carbide, 180 X, Simonds Abrasive Div., The Wallace Murray Corp. | 90.0 |
| Coors "METLX" Pellets | 400.0 |
| Trimelltic Anhydride, Amoco Chemical Company | 50.0 |
| | 640.0 |

It will be noted that this last example is not a two-component composition but rather only one. The composition of this example can be suitably packaged and applied at the point of use and then cured or hardened by heat. For example, after it is applied, it might be cured for two hours at about 250° F. followed by an additional, say, 6 hour cure at 350° F.

In certain situations, two parts of Stannous Octoate, supplied by the National Lead Company, could be added to the single component example to reduce the curing time to something on the order of five minutes at 300° F.

The wearing composition may be applied or used on any one of a number of parts or surfaces. Good examples are feed chutes, buckets, hoppers, feed plates, pipe and elbows, side plates, diverter plates, discharge chutes and skirts, sand slinger, and the feed spout of grinding mills. It might also be used on trunnion liners, pump casing, return idlers, screens, dust collectors and cyclones and the like. The above are merely examples and it should be understood that other applications are important, such as the hard surfacing of classifier flights and shoes, the drums of cement trucks, fan blades, the surfacing of pan feeders, cobbler repulp circulators, the buckets and teeth of front end loaders, and so forth.

The large abrasive resistant particles have been stated as being high alumina ceramic particles, but a number of other particles could be used, such as boron nitride, tungsten carbide, silicon carbide, boron carbide and the like.

The large particles have been shown as generally round or spherical. But, in certain situations, chips might be used. Round particles may be used for a trowelable mix, but in certain applications, chips might be used. For example, if the composition is to be applied or cast, chips would not be objectionable and they might be less expensive. In certain situations, chips could be used in a trowelable mixture. This is particularly true in a casting system where different beads would be appropriate.

The examples both as to time and temperature given hereinabove are merely for purposes of description. The curing time is flexible and can be varied by modifying the formula somewhat to fit or suit any particular application. The same is true of curing temperature.

We claim:
1. A method of making a surface substantially more wear resistant where the surface is subject to wear caused by impact, abrasion, erosion or corrosion, including the steps of supplying (a) an uncured curable crosslinkable thermosetting resin and (b) a curing agent for the resin, separately, in about a 2 to 1 ratio, and a thixotropic agent in an amount sufficient to prevent settling, intermixing independently in (a) and (b) both large abrasion resistant ceramic particles and much smaller coabrasion resistant filler particles of a hardness on the order of that of the material causing wear with the smaller particles dispersed in random fashion among the larger particles, mixing all the ingredients and applying the resultant mixture to the surface subject to wear and allowing it to cure and firmly adhere to the surface.

2. The method of claim 1 further characterized in that the large abrasion resistant ceramic particles are metal coated alumina ceramic beads.

3. The method of claim 1 further characterized in that the large abrasion resistant ceramic particles are spherical beads.

4. The method of claim 1 further characterized in that the smaller co-abrasion resistant filler particles are silicon carbide.

5. The method of claim 1 further characterized in that the resin is an epoxy resin.

6. The method of claim 1 further characterized by and including the step of mixing both large and smaller particles separately in the resin and curing agent prior to mixing the resin and curing agent together.

7. The method of claim 1 further characterized in that the large abrasion resistant ceramic particles are on the order of 1/16 inch in their largest dimension and the smaller coabrasion resistant filler particles are on the order of 180 mesh size.

* * * * *